E. H. WHITE.
CHAIN AND OTHER ANTISKIDDING APPLYING DEVICE.
APPLICATION FILED MAY 24, 1916.
1,295,657.
Patented Feb. 25, 1919.
5 SHEETS—SHEET 1.
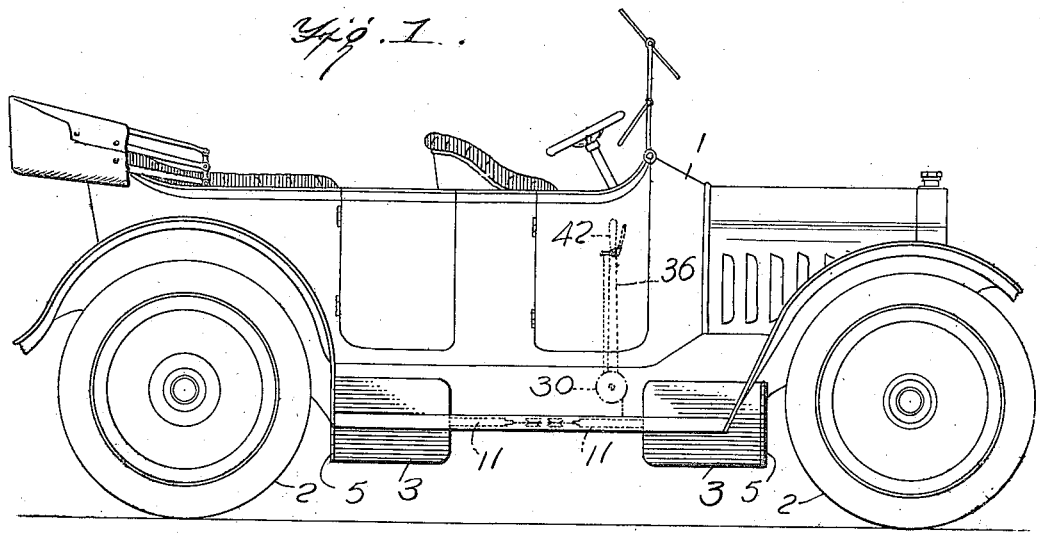
Fig. I.
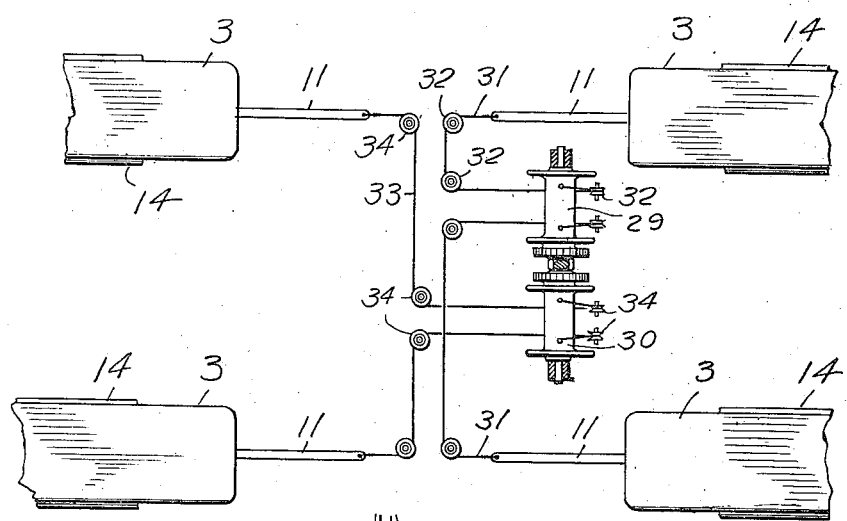
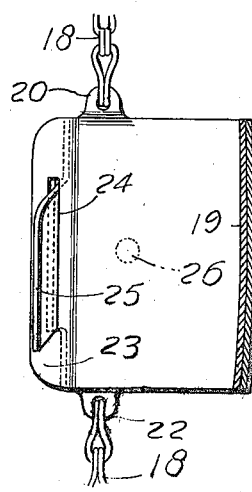
Fig. II.
Fig. 12.
WITNESSES:
L. H. Schmidt
C. E. Trainor
INVENTOR
EDWARD H. WHITE,
BY
ATTORNEYS

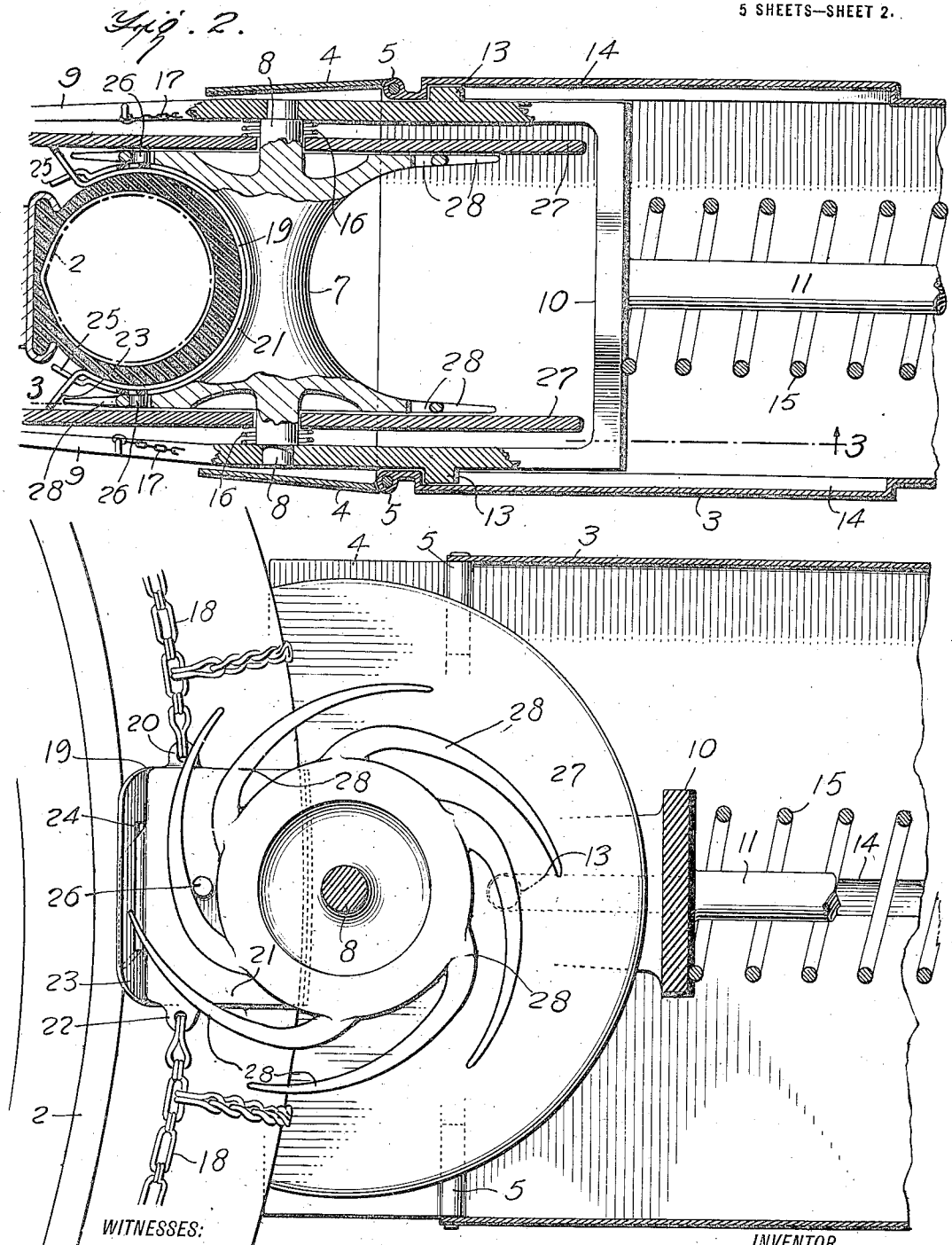

E. H. WHITE.
CHAIN AND OTHER ANTISKIDDING APPLYING DEVICE.
APPLICATION FILED MAY 24, 1916.

1,295,657.

Patented Feb. 25, 1919.
5 SHEETS—SHEET 3.

WITNESSES:

INVENTOR
EDWARD H. WHITE,
BY
ATTORNEYS

E. H. WHITE.
CHAIN AND OTHER ANTISKIDDING APPLYING DEVICE.
APPLICATION FILED MAY 24, 1916.
1,295,657.
Patented Feb. 25, 1919.
5 SHEETS—SHEET 4.
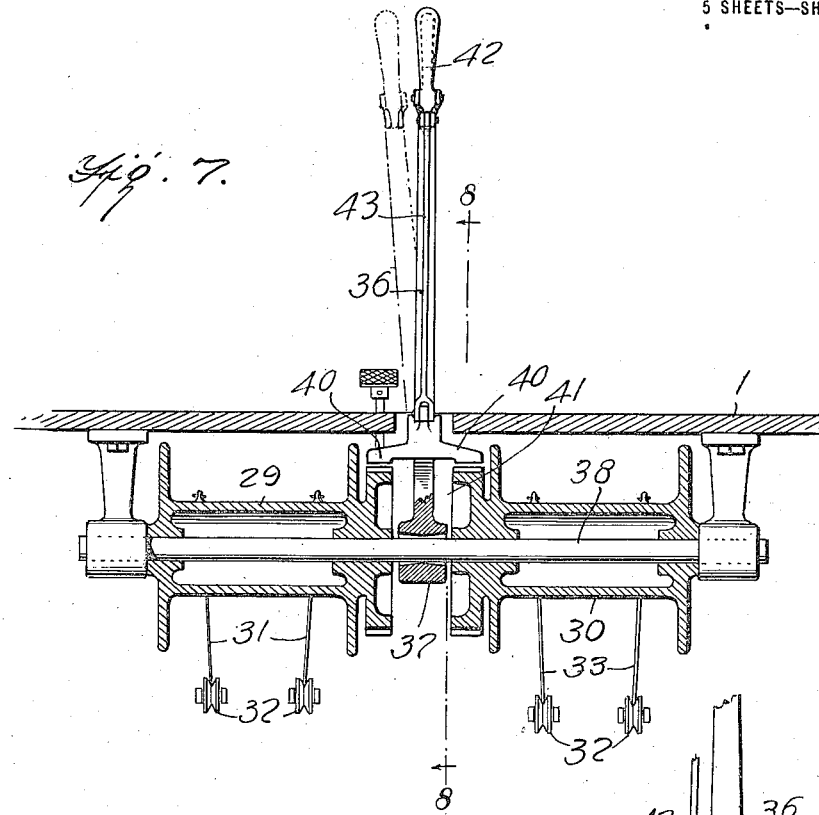
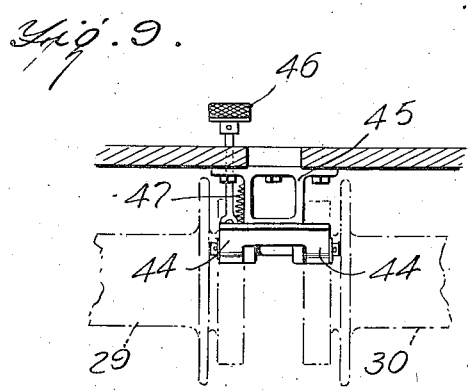
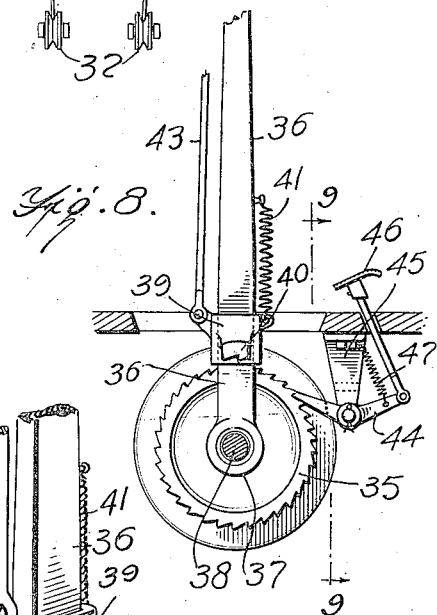
WITNESSES:
INVENTOR
EDWARD H. WHITE,
BY
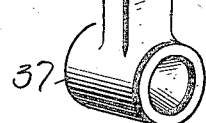
ATTORNEYS E. H. WHITE.
CHAIN AND OTHER ANTISKIDDING APPLYING DEVICE.
APPLICATION FILED MAY 24, 1916.
1,295,657. Patented Feb. 25, 1919.
5 SHEETS—SHEET 5.
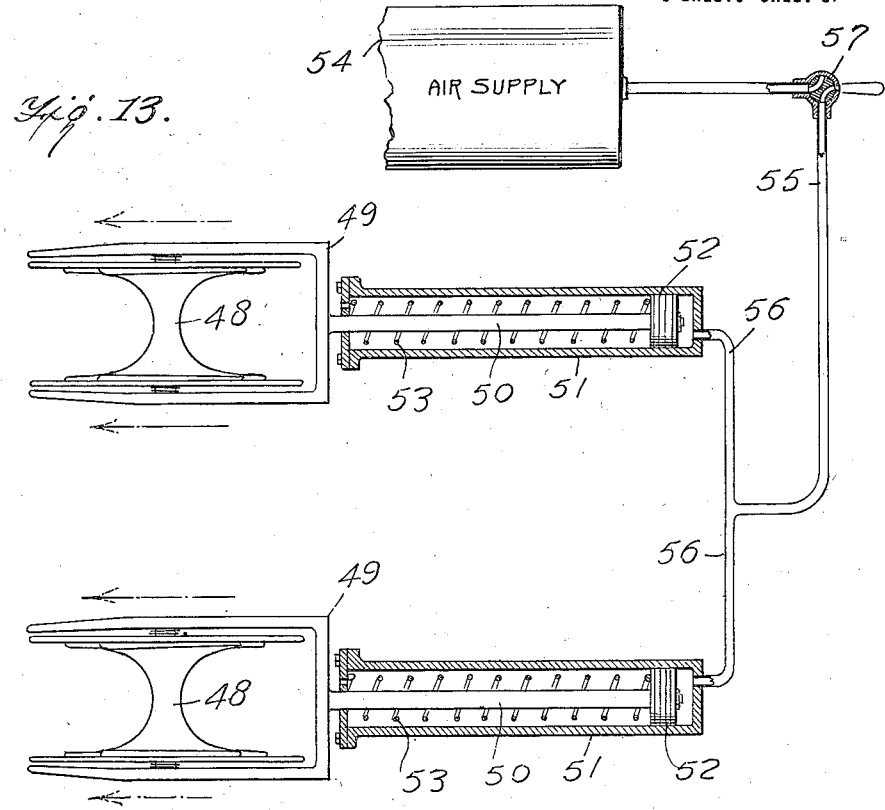
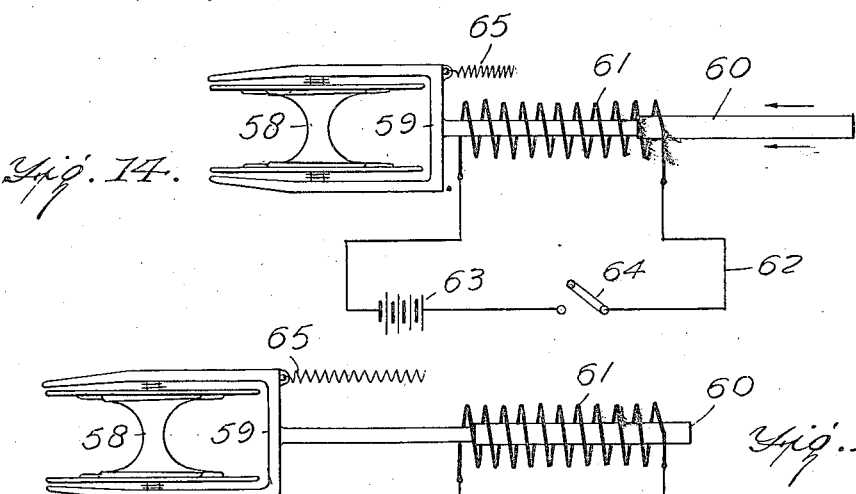
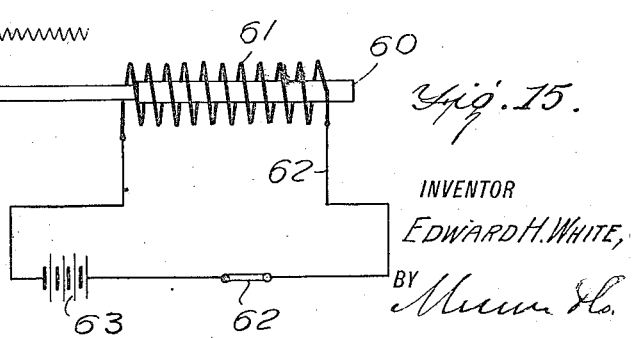
WITNESSES:
INVENTOR
EDWARD H. WHITE,
BY
ATTORNEYS

UNITED STATES PATENT OFFICE.

EDWARD H. WHITE, OF CUMBERLAND, MARYLAND, ASSIGNOR OF ONE-THIRD TO WILLIAM W. FARNSWORTH, OF LITTLETON, COLORADO, AND ONE-THIRD TO EDWARD A. RYAN, OF KANSAS CITY, MISSOURI.

CHAIN AND OTHER ANTISKIDDING APPLYING DEVICE.

1,295,657.  Specification of Letters Patent.  Patented Feb. 25, 1919.

Application filed May 24, 1916. Serial No. 99,506.

*To all whom it may concern:*

Be it known that I, EDWARD H. WHITE, a citizen of the United States, and a resident of Cumberland, in the county of Allegany and State of Maryland, have invented a new and useful Improvement in Chain and other Antiskidding Applying Devices, of which the following is a specification.

My invention is an improvement in chain applying devices, and has for its object to provide mechanism for use in connection with motor vehicles for permitting tire chains and other antiskidding devices to be automatically applied to the wheels or removed therefrom while the car is in motion, and without the necessity of handling the chain or the wheel.

In the drawings:—

Figure 1 is a side view of an automobile provided with the improved applying mechanism.

Fig. 2 is a horizontal section of one of the applying mechanisms,

Fig. 3 is a section on the line 3—3 of Fig. 2,

Figure 6:
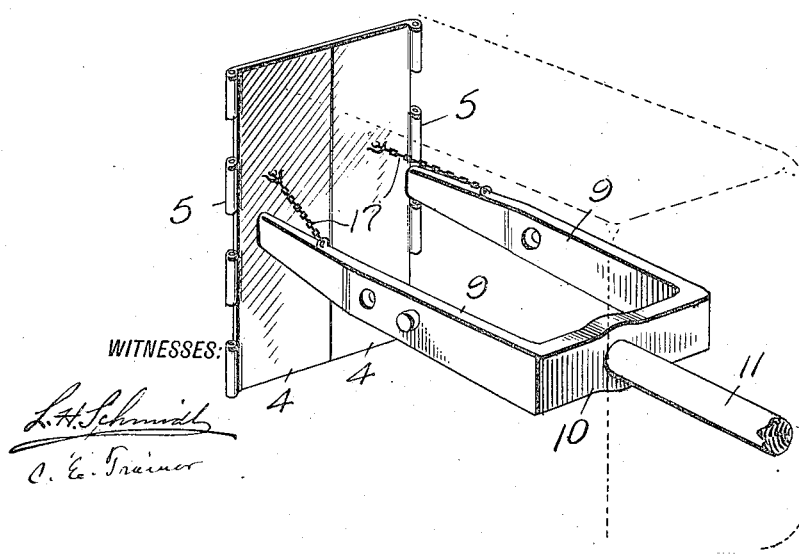

Fig. 6 is a perspective view of one of the drum supports and the door opening controlling mechanism, Fig. 7 is a vertical section at the drums, Fig. 8 is a section on the line 8—8 of Fig. 7, looking in the direction of the arrows adjacent to the line, Fig. 9 is a section on the line 9—9 of Fig. 8, looking in the direction of the arrows adjacent to the line, Fig. 10 is a perspective view of the drum operating lever, Fig. 11 is a diagrammatic top plan view of the drums and their connection, Fig. 12 is a vertical section through the holding clamp for the tire chains, Fig. 13 is a diagrammatic view of a modified construction, Fig. 14 is a similar view of another embodiment of the invention showing the parts in one position, and Fig. 15 is a view showing the parts in another position.

The embodiment of the invention shown in Figs. 1 to 12 is shown in connection with an automobile, comprising a body 1 and wheels 2, and mechanism is arranged adjacent to each wheel for placing the tire chains and removing the same, the said mechanism being operable from the driver's seat. The said mechanisms are alike, each consisting of a casing 3, substantially rectangular in cross section, and having one end provided with doors 4, which are hinged to the side walls of the casing as indicated at 5 in such manner that the doors may swing outwardly into the position of Figs. 2 and 4 or into the closed position of Figs. 5 and 6.

Each of these casings 3 is provided at the opposite end from the doors with a bearing 6 and a reel 7 is supported in each casing, each reel having journal pins 8, which are journaled in openings in the arms 9 of a yoke, comprising the said arms and a body 10. The body is provided at its center with a rounded journal pin 11, which extends in the opposite direction to the arms of the yoke through the bearing 6 before mentioned, and the outer end of the pin has an eye 12 for permitting the pin to be connected with controlling mechanism for the reel.

Each arm of the yoke is provided with an outwardly extending pin 13 intermediate its ends, and each of the said pins engages within a guideway 14, extending longitudinally of the casing in the adjacent side wall, and the engagement of the pins with the guideways together with the engagement of the pin 11 with the bearing 6, constrains the yoke to move in the same horizontal plane. A coil spring 15 encircles each pin between the body of the yoke and the end of the casing adjacent to the bearing 6, and normally tends to move the yoke toward the doors 4 of the casing.

Figure 4:
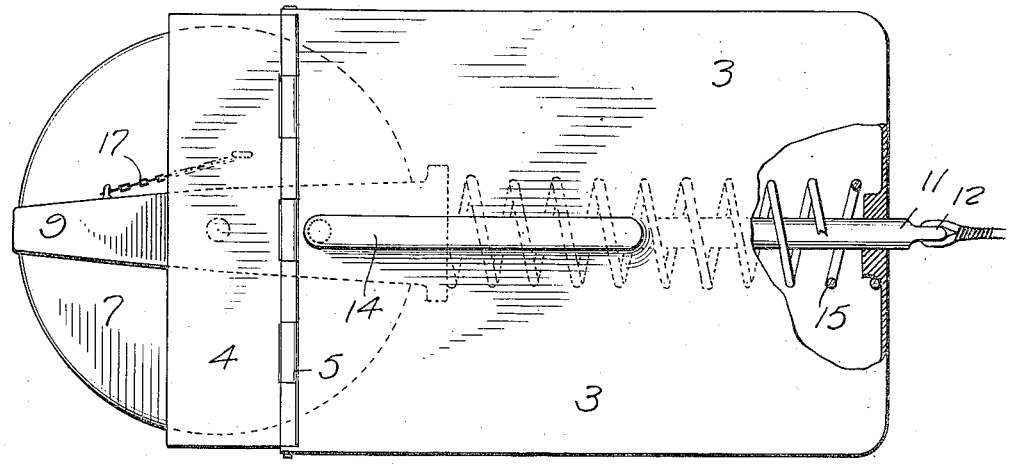
Fig. 4 is a side view of one of the said mechanisms with parts broken away.

A spring 16 encircles each journal pin 8 between the reel 7 and the adjacent arm of the yoke, and these springs tend to steady the motion of the reel and to act in a manner as brakes to prevent over movement of the reels. It will be noticed from an inspection of Figs. 5 and 6, that the arms of the yoke are extended beyond the openings for the journal pins 8 to a point flush with the periphery of the flanges of the reel, and when the yoke is moved toward the doors 4 under the influence of the spring 15 these extended ends of the yoke arms will engage the doors ahead of the reel and will swing the doors open as shown in Figs. 2 and 4.

Figure 5:
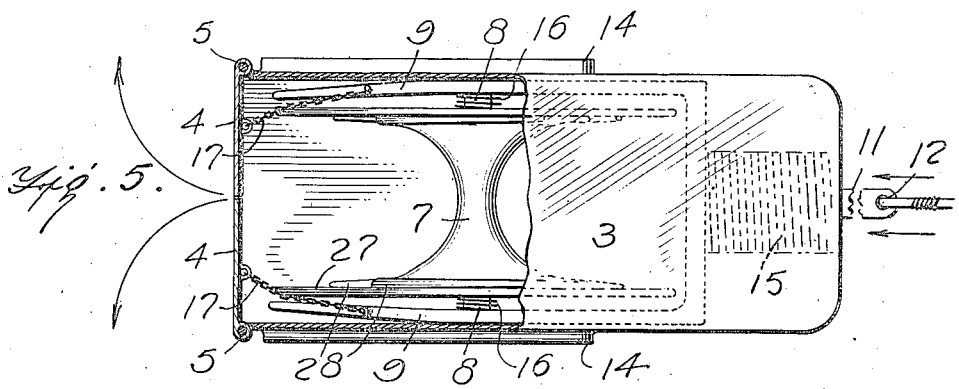
Fig. 5 is a top plan view with parts broken away.

Each door is connected to the adjacent arm by means of a flexible member 17, a chain in the present instance, and it will be evident that when the reel is withdrawn into the casing the flexible members will close the doors and move them into the position of Figs. 5 and 6. Each tire chain 18 which may be of any suitable construction is wound upon a reel in such manner that when the reel is moved near to the wheel as indicated in Figs. 2 and 3 one end of the chain will be brought into contact with the tire and will be clamped thereto by mechanism to be later described, and the movement of the chain as it is applied to the tire will unwind the chain and the other end of the chain will be connected with the first-named end in a manner to be presently described.

A clamp is provided for connecting the chains together on the wheel, and the said clamp consists of sections, each section being a spring clip of approximately U-shape. The first or inner section 19 is of approximately U-shape as above mentioned and (referring to Fig. 3) is provided at the upper edge of each arm with a depending eye 20, to which the ends of the side chains of the tire chains are connected. The second or outer section 21 is shaped to fit over the section 19, and the lower edge of the arms of the said clip are provided with eyes 22 for engagement by the side chains of the tire chain. As shown more particularly in Fig. 12 these clips or clamp sections are interlocking, the inner section 19 engaging the tire and clamping one end of the chain to the tire, while the other clip or section 21 engages the first-named clip or section to lock the other end of the chain to the tire and to the first-named clip.

The clip 19 is provided at its ends with outwardly turned lips 23, and these lips have vertical slots 24, which are adapted to be engaged by tongues 25 on the section 21. It will be noticed from an inspection of Figs. 3 and 12 that these tongues 25 extend inwardly and downwardly in such manner that when the clips are in register as in Fig. 12, there will be an interlocking action between the tongues and the lower ends of the slots to prevent displacement of the sections with respect to each other under the traction exerted by the chain. The section 21 must be moved upward slightly with respect to the section 19 before the tongues 25 can be disengaged from the slots 24.

The lips 23 are of a length to engage the inner faces of the reel flanges as shown in Fig. 2 and the section 21 of the clamp is provided on each arm with an outwardly extending pin 26. It will be noticed from an inspection of Fig. 2 that the reel flanges 27 are disks disconnected from the reel proper, and journaled on the journal pins 8. These flanges are normally pressed inward toward the reel proper by the springs 16, and the reel body which has a concave periphery is provided at each end with a series of approximately tangential teeth or arms 28, whose outer faces engage the inner faces of the disk or flanges 27. Each of these arms 28 extends outward from the end of the reel and then each arm is curved approximately tangential, the arms curving in the same direction and registering with the arms at the opposite end of the reel.

The pins 26 of the outer section 21 of the clamp are engaged between the arms and the periphery of the reel 7 as indicated in Figs. 2 and 3 to support the said clip in proper position for placing the same on the reel.

In operation the yokes and the reels are normally held within the casings 3 by mechanism to be later described, so arranged that all four reels may be simultaneously released or the reels pertaining to the front and rear wheels may be independently released. When any reel and its yoke is released the spring 15 will force the yoke toward the door 4, swinging the said doors open and bringing the reel into contact with the tire of the adjacent wheel. Since the tire chain is wound upon the reel with that end to which the clip 19 is connected outward, and so supported by the disk 27 and the reel that it is in position to engage over the tire the said clip will be forced over the tire as shown in Fig. 2, thus anchoring the adjacent end of the chain to the wheel.

As the wheel rotates the reel will be rotated and the tire chain will be drawn off and applied to the wheel. When the opposite end of the chain is reached, the clip 21 thereon will be pushed over the clip 19, the tongues 25 of the said clip engaging the slots 24 of the clip 19, and the clips will be locked together, locking the chain on the wheel. The arrangement of the arms 28 of the reels permits the pins 26 to move out of position between the said arms and the reel 7 without interference from the said arms. It is immaterial whether or not the clip 19 is in position to engage the wheel at once when the reel engages the tire for the reel will be rotated by the wheel and as soon as the clip 19 comes into register with the wheel it will be clamped on the tire.

With the tire chain in place on the wheel, it will be evident that a reverse movement of the wheel with the reel in contact therewith will remove the tire chain and wind it on the reel in position to be again applied to the tire when desired. As for instance, were that portion of the wheel shown in Fig. 3 moving upward instead of downward with the reel in the position shown, it would be evident that the pins 26 of the clip 21 would engage between the arms 28 and the peripheral ends of the reel, and a continual upward movement of the clip with respect to the reel would draw the section 21 away from the section 19. The continuous movement of the wheel will rotate the reel and the chain will be wound on the reel and when wound the clip 19 will be pulled off the tire.

In Figs. 11 and 7 is shown mechanism for permitting the tire chains of the rear wheels to be simultaneously applied or for permitting the tires of the front wheels to be simultaneously applied. The said mechanism comprises a pair of drums 29 and 30, which are journaled in alinement, and flexible members 31 are connected with the journal pins 11 of the reels at the front wheels at one end of the said flexible members, the other ends winding upon the reel 29, and direction elements 32 are provided for guiding the flexible members. Other flexible members 33 are connected with the journal pins 11 of the reels at the rear wheels at one end of the said flexible members, the other ends winding upon the drum 30, and direction elements 34 are provided for guiding the said members.

Mechanism is provided for permitting the drums 29 and 30 to be simultaneously rotated in one direction or to be independently rotated in the said direction, and other mechanism is provided for holding the drums with the springs 15 of the several reels under compression. Each drum is provided at its inner end with a gear wheel 35, and a lever 36 is provided with a bearing sleeve 37 encircling the shaft 38 upon which the drums 29 and 30 are journaled. The bore of the bearing sleeve 37 as shown in Figs. 7 and 10, is tapered in opposite directions, so that the lever 36 may be rocked with respect to the shaft as indicated in dotted lines in Fig. 7.

A pawl carrier or a pawl carrying sleeve 39 is mounted to slide on the lever 36, and this sleeve is provided with oppositely extending pawls 40, which are designed to engage the teeth of the ratchet wheels 35. This pawl carrying sleeve is normally pulled away from the shaft 38 by means of coil springs 41, arranged between the said pawl carrier and the lever and the pawl carrier may be pushed downward by means of a latch lever 42, pivoted to the upper end of the lever 36, and connected to the pawl carrier by a link 43.

The drums are releasably held from rotation under the influence of the springs 15 by means of a holding pawl 44, which is pivoted to a bracket lug 45 on the body of the car. A treadle 46 is connected with the outer end of the pawl for releasing the same, and each pawl is normally held in operative position by means of a spring 47. By depressing the treadles or foot plates, the holding pawls may be released, and the springs 15 will immediately move the yokes and reels out of the casings. The lever 36 may be rocked to release either drum. When the lever is in the dotted line position of Fig. 7 the drum 29 will be held while the drum 30 will be released. When the lever is rocked in the opposite direction the drum 30 will be held and the drum 29 will be released. By pressing foot treadle both drums may be simultaneously released.

In operation if it were desired for instance, to apply the chains to the rear wheels the lever 36 would be moved into the dotted line position of Fig. 7 and the treadle 46 would be operated to release the holding pawl 44 of the drum. The springs 15 in the casings 3 at the rear wheels would immediately move the reels and the yokes toward the rear wheels, and the tire chains would be applied to these wheels. As soon as the chains were in place the drum 30 might be rotated forwardly to wind up the flexible members 33 to withdraw the drums back into their casings. If now it should be desired to apply the chains to the front wheels, the drum 29 would be released and after the chains were applied the reels would be returned.

In Fig. 13 mechanism is shown for controlling the tire chain applying reels by air under pressure. With this construction the reels 48 are mounted in the yokes 49 in precisely the same manner as the reels 7, and the yokes are mounted in casings corresponding to the casings 3. The journal pins 50 of the yokes extend into cylinders 51, and each pin 50 has a head or piston 52, connected therewith in the cylinder. A coil spring 53 encircles each pin between the head or piston 52 and the end of the cylinder adjacent to the reel, the spring acting normally to return the reel to inoperative position in the casing. A source 54 of air under pressure is provided, which is connected to the cylinders of the reels at the front or rear wheels by means of a pipe 55, having branches 56 leading to the respective cylinders.

A four-way valve 57 is interposed in the pipe 55, and by means of the said valve the cylinders 51 may be connected with the source 54 or with the atmosphere. It will be evident that when the cylinders are connected with the source, the pistons 52 will be driven in a manner to approach the tire chain supporting reels to the wheels, while when the cylinders are connected with the atmosphere the springs 53 will return the reels to normally inoperative position.

In Figs. 14 and 15 electrically controlled mechanism is shown for controlling the movement of the tire chain supporting reels. With this construction the reels 58 are mounted in the yokes 59, and the yokes have solenoid cores 60, extending from the bodies in the opposite direction to the arms of the yoke. Each of these cores 60 extends through a coil 61 which is interposed in a circuit 62, having a source of supply 63 and a switch 64. The cores 60 are spaced apart from the yokes and the coils 61 are arranged between the cores and the yokes when the reel is in inoperative position, and when the coil is energized the core will be drawn into the coil and it will be moved in a direction to move the reel toward the adjacent wheel.

A coil spring 65 is connected with each yoke for returning the yoke to inoperative position. In Fig. 14 the reel is shown in withdrawn or inoperative position, while in Fig. 15 the reel is shown in operative position adjacent to the wheel. When the switch 64 is closed to close the circuit 63, the coil will be energized and the parts will be moved in the position of Fig. 15, applying the tire chains to the wheel. It will be understood that if desired the reel controlling mechanisms of the front or rear wheels may be coupled together in the same manner as shown in Figs. 11 or 13.

I claim:—

1. In combination with a motor vehicle, a casing mounted adjacent to each wheel and having doors adjacent to the wheel, a reel support in each casing and having guided movement in the casing toward and from the wheel, a reel journaled on the support and having a concave periphery for engaging the tire, and supporting a tire chain wound on the reel, the ends of the chain having interlocking U-shaped clips for engaging the tire to connect the ends of the chain together and to the tire, a spring normally pressing each reel support toward the wheel, each support having means for opening and closing the doors as it moves toward and from the wheel, independent means for drawing the reel supports at the front and at the rear wheels into inoperative position, and releasable means for holding the said means with the supports withdrawn.

2. In combination with a motor vehicle, a casing mounted adjacent to each wheel and having doors adjacent to the wheel, a reel support in each casing and having guided movement in the casing toward and from the wheel, a reel journaled on the support and having a concave periphery for engaging the tire and supporting a tire chain wound on the reel, the ends of the chain having interlocking means for connecting the ends of the tire chain on the wheel, a spring normally pressing each reel support toward the wheel, each support having means for opening and closing the door as it moves toward and from the wheel, independent means for drawing the reel supports at the front and at the rear wheels into inoperative position, and releasable means for holding the said means with the supports withdrawn.

3. In combination with a motor vehicle, a casing mounted adjacent to each wheel and having doors adjacent to the wheel, a reel support in each casing and having guided movement in the casing toward and from the wheel, a reel journaled on the support and having a concave periphery for engaging the tire and supporting a tire chain wound on the reel, the ends of the chain having interlocking means for connecting the ends of the tire chain on the wheel, a spring normally pressing each reel support toward the wheel, and releasable means for holding the supports in the casing.

4. In combination with a motor vehicle, and a tire chain having interlocking tire clasping end pieces, a chain supporting reel on which each chain is normally carried adjacent to each wheel, said reel operated by the movement of the wheel for applying or removing its tire chain to the wheel, normally operative means for moving each of the said reels toward the wheel and into operative position, and releasable means for restraining the operation of the said means.

5. A tire chain having at its ends interlocking clips for permitting the chain to be locked upon the wheel, each of the clips being substantially U-shaped for engaging over the tire and one clip engaging over the other clip, the first-named clip having outturned lips at its extremities and the lips having slots and the other clip having tongues for engaging the slots and having outwardly extending pins for engagement by the placing means.

6. A tire chain having at its ends clips for permitting the chain to be locked upon the wheel, each of the clips being substantially U-shaped for clasping engagement with the tires, and one clip engaging over the other clip, the clips having interlocking mechanism.

7. In a device of the character specified, the combination with the wheel and the tire, of a tire chain, means normally withdrawn from the wheel for supporting the same when not in use, said chain having means at each end for engaging the tire to hold the chain in place, and the said means having interlocking portions, and means for moving the supporting means toward the wheel to cause the said engaging means of the chain to engage the tire in succession and interlock with one another.

8. In a device of the character specified, the combination with the wheel and tire of a tire chain having interlocking means on the opposite ends thereof, and means normally withdrawn from the wheel for supporting said chain when not in use, and adapted to press said interlocking means into interengagement when moved into position in proximity to the wheel.

EDWARD H. WHITE.